United States Patent [19]
Juall

[11] Patent Number: 5,745,786
[45] Date of Patent: Apr. 28, 1998

[54] METHOD AND APPARATUS FOR ASSIGNING MEMORY SPACE ADDRESSES TO MEMORY ON COMPUTER INTERFACE BOARDS

[75] Inventor: Chester Juall, Hawthorne, N.J.

[73] Assignee: Dialogic Corporation, Parsippany

[21] Appl. No.: 188,555

[22] Filed: Jan. 27, 1994

[51] Int. Cl.[6] .................................................. G06F 13/00
[52] U.S. Cl. ............................................ 395/829; 395/651
[58] Field of Search ...................................... 395/650, 700, 395/325, 425, 725, 829, 830, 401, 403, 500, 118, 180, 800, 651; 364/271

[56] References Cited

U.S. PATENT DOCUMENTS

| | | | |
|---|---|---|---|
| 4,685,140 | 8/1987 | Mount, II | 382/6 |
| 5,012,514 | 4/1991 | Renton | 380/4 |
| 5,149,972 | 9/1992 | Fay et al. | 250/461.1 |
| 5,237,689 | 8/1993 | Behnke | 395/700 |
| 5,249,230 | 9/1993 | Mihm, Jr. | 380/23 |
| 5,257,387 | 10/1993 | Richek, et al. | 395/800 |
| 5,258,604 | 11/1993 | Behrens et al. | 235/462 |
| 5,263,148 | 11/1993 | Jones, Jr. et al. | 395/500 |
| 5,444,825 | 8/1995 | Nakabayashi | 395/823 |
| 5,530,895 | 6/1996 | Enstrom | 395/829 |
| 5,588,067 | 12/1996 | Peterson et al. | 382/103 |

OTHER PUBLICATIONS

"An ASIC RISC-Based I/O Processor for Computer Applications", Euro ASIC'90.
Plug and Play ISA Implementation Workshop, Jun. 2nd 1993.
IBM Micro Channel Technical Reference Manual (Excerpt).

*Primary Examiner*—Kevin A. Kriess
*Attorney, Agent, or Firm*—Michael B. Einschlag

[57] ABSTRACT

Method and apparatus for assigning memory space addresses of a computer, for example, a personal computer (PC), to memory contained on computer interface boards interfaced to the computer wherein the computer controls the memory space addresses assigned and wherein multiple computer interface boards can be assigned to the same memory space addresses. An embodiment of the inventive method includes the steps of: (a) setting a computer interface board identification at the computer interface board; (b) causing the computer to transmit a predetermined pattern of data and other data from which the computer interface board identification can be derived to predetermined addresses of memory space in the computer, which addresses are assigned to memory contained on the computer interface board; and (c) at the computer interface board, determining addresses assigned to the memory contained on the computer interface board from information received from the computer as a result of the step of causing the computer to transmit.

35 Claims, 1 Drawing Sheet

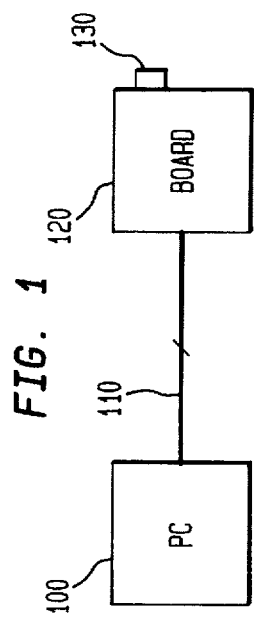

METHOD AND APPARATUS FOR ASSIGNING MEMORY SPACE ADDRESSES TO MEMORY ON COMPUTER INTERFACE BOARDS

TECHNICAL FIELD OF THE INVENTION

The present invention pertains to method and apparatus for assigning memory space addresses of a computer to memory contained on a computer interface board (i.e., establishing addresses at which memory on a computer interface board appears to the computer).

BACKGROUND OF THE INVENTION

Those of ordinary skill in the field of designing computer interface boards understand that a computer such as, for example, a personal computer (PC), may be configured so that certain portions of memory space of the computer, i.e., addresses, correspond to memory contained on a computer interface board. In such a case, in order for the PC: (a) to transmit data to or (b) to receive data from memory on the computer interface board, it is necessary to establish addresses in the memory space of the PC which correspond to the memory contained on the computer interface board.

An industry standard architecture (ISA) computer interface board transmits data (from memory contained on the computer interface board) to a computer, for example, a PC, over a computer bus and the computer interface board stores data (in the memory contained on the computer interface board) which the board receives from the computer over the bus. In order to perform these functions, the PC places address information onto the bus, the computer interface board recognizes the address information as referring to its memory and, in response, the computer interface board either transmits or receives data to or from the PC in accordance with an instruction the computer interface board receives from the PC over the bus. The PC utilizes a specific range of addresses in its memory space when transmitting data to or receiving data from memory contained on a specific board. In particular, a specific range of addresses in the memory space of the computer is assigned to a specific board so that only the specified board transmits or receives data and not any other board.

As is well know to those of ordinary skill in the art, in transmitting data to or receiving data from memory contained on a computer interface-board, the PC acts as if the memory contained on the computer interface board were part of its own computer memory. Thus, for example, if the PC transfers data to a given address in its memory space that corresponds to memory contained on a computer interface card, a translation function within the PC identifies this and translates the "instruction to transfer data to computer memory" to an "instruction to transfer data to the computer interface board which contains memory which is assigned the given address in the PC memory space." In accordance with a present method for assigning memory space addresses of a computer to memory contained on a computer interface board (i.e., establishing addresses at which memory on a computer interface board appears to the computer), the computer interface board is fabricated to include a DIP switch which determines the memory space addresses of the PC to which the board is assigned. Thus, in essence, the DIP switch on the board selects the memory space addresses assigned to the board. Since the board selects the memory space addresses, only one board can utilize a particular DIP switch setting and, therefore, only one board can be assigned to a particular set of memory space addresses of the PC.

The above-described method for assigning memory space addresses of a computer to memory contained on a computer interface board (i.e., establishing addresses at which memory on a computer interface board appears to the computer) has two main disadvantages. These two main disadvantages arise from the fact that the board selects the memory space addresses and not the computer. The first disadvantage is a lack of flexibility since the computer cannot establish the memory space addresses assigned to the board memory by, for example, software. The second disadvantage is a lack of system flexibility since only one board can utilize a particular area of memory space of the PC. This second disadvantage is understood from the following example. In a typical configuration which utilizes an IBM compatible PC, each computer interface board utilizes 8K of PC memory space. Therefore, if there are eight (8) boards interfaced to the PC, 64K of memory space in the PC is required to service the boards. This becomes a disadvantage whenever memory space in the PC becomes limited due, for example, to addressing limitations in the PC.

In light of the above, there is a need in the art for method and apparatus for assigning memory space addresses of a computer to memory contained on computer interface boards interfaced to the computer (i.e., establishing addresses at which memory on a computer interface board appears to the computer) wherein the computer controls the memory space addresses assigned to the memory contained on the computer interface boards and wherein multiple computer interface boards can be assigned to the same memory space addresses.

SUMMARY OF THE INVENTION

Embodiments of the present invention advantageously solve the above-identified need in the art by providing method and apparatus for assigning memory space addresses of a computer to memory contained on computer interface boards interfaced to the computer (i.e., establishing addresses at which memory on a computer interface board appears to the computer) wherein the computer controls the memory space addresses assigned to the memory contained on the computer interface boards and wherein multiple computer interface boards can be assigned to the same memory space addresses.

In particular, an embodiment of the inventive method comprises the steps of: (a) setting a computer interface board identification at the computer interface board; (b) causing the computer to transmit a predetermined pattern of data and other data from which the computer interface board identification can be derived to predetermined addresses of memory space in the computer, which addresses are assigned to memory contained on the computer interface board; and (c) at the computer interface board, determining addresses assigned to the memory contained on the computer interface board from information received from the computer as a result of the step of causing the computer to transmit. In a preferred embodiment of the present invention, the computer interface board identification is set at the computer interface board by adjusting a rotary switch.

BRIEF DESCRIPTION OF THE DRAWING

A complete understanding of the present invention may be gained by considering the following detailed description in conjunction with the accompanying drawing, in which:

FIG. 1 shows a block diagram of a computer interfaced with a computer interface board to help illustrate the present invention which is method and apparatus for assigning memory space addresses of the computer to memory contained on the computer interface board; and FIG. 2 shows a block diagram of a preferred embodiment of board locator logic for use in connection with the present invention.

DETAILED DESCRIPTION

Embodiments of the present invention advantageously solve the above-identified need in the art by providing method and apparatus for assigning memory space addresses of a computer to memory contained on a computer interface board. In particular, FIG. 1 shows a block diagram of computer 100, for example, personal computer 100 (PC 100), interfaced over bus 110 with computer interface board 120 (board 120). As will be described below, in accordance with the present invention, PC 100 controls the assignment of memory space addresses in PC 100 to memory contained on computer interface board 120 and PC 100 can interface with multiple computer interface boards using the same memory space addresses.

As shown in FIG. 1, board 120 is an industry standard architecture board generally referred to as an ISA board and PC 100 is an IBM compatible personal computer. However, the present invention is not restricted to this particular embodiment and this embodiment is merely utilized for purposes of illustrating a preferred embodiment of the invention.

The following convention is used below. However, it should be understood that the convention is used merely for the purpose of explaining the preferred embodiment of the present invention and it is not meant to limit the present invention. In accordance with the convention, a specific area of memory space in PC 100 is assigned to memory contained on computer interface boards, such memory space will be referred to as board-interaction memory space. Further, the board-interaction memory space can be considered to be broken into several areas, each of which areas starts at a particular base address. Thus, in accordance with the convention, an address in an area of board-interaction memory space is comprised of a base address (which relates to one of the areas) and an offset from that base address. With this convention in mind, we now turn to a description of a preferred embodiment of the present invention.

Board 120 is configured with the following information: (a) board 120 is configured to recognize predetermined areas of the memory space of PC 100, which predetermined addresses will be identified by their predetermined base addresses; (b) board 120 is configured to recognize a predetermined pattern of data which is transmitted to it from PC 100; (c) board 120 is configured to search for the predetermined pattern of data at predetermined offsets from the predetermined base addresses in the memory space of PC 100; and (d) switch 130 determines a board identification.

Switch 130 in FIG. 1 is, for example, a switch that indicates numbers which are used in accordance with the present invention as a board identification in the manner described in detail below. Switch 130 may be embodied in any number of ways which are well known to those of ordinary skill in the art such as, for example, a rotary switch, a hex-encoded rotary switch, a DIP switch, and so forth. However, as those of ordinary skill in the art will readily appreciate, switch 130, which indicates board identification, serves a purpose which is different from that served by DIP switches which are utilized in the prior art to indicate an address in the memory space of PC 100. Further, the embodiment shown in FIG. 1 entails the use of switch 130 for indicating board identification so the board may be re-identified by resetting the switch. However, it is within the spirit of the present invention that the board identification may be set on the board in hardware or firmware in a manner which is well known to those of ordinary skill in the art. For example, in some embodiments, the board identification may be established by transfer of data from the computer.

Board 120 is comprised of hardware which is well known to those of ordinary skill in the art for detecting "power-up" and board 120 is comprised of hardware which will be described in detail below for detecting whether PC 100 wishes to reassign memory space addresses for memory contained on board 120, i.e., locate the board memory. In either case, board 120 enters a HUNT or LOCATING mode. In accordance with the present invention, PC 100 assigns memory space addresses in PC 100 to memory contained on board 120 (having a board identification determined by switch 130) by selecting one of the base addresses in the board-interaction memory space. Next, PC 100 writes the predetermined pattern of data to the predetermined offset location from the selected base address in the board-interaction memory space followed by the board identification. In accordance with methods which are well known to those of ordinary skill in the art, this write is translated into a transmission of the pattern of data, memory space addresses of the data, and board identification over the computer bus to board 120. Board 120 receives the pattern of data, the board identification, and the memory addresses. In response, whenever it is in the HUNT or LOCATING mode, board 120 cycles through predetermined base addresses in the board-interaction memory space of PC 100 which are stored on board 120 to find a match with the base address of the data transmitted from PC 100. Board 120 cycles through the predetermined base addresses in the board-interaction memory space of PC 100 which are stored on board 120 one at a time. Whenever board 120 discovers a match between the base address of the transmitted data with one of the stored base addresses, board 120 examines: (a) the offsets of the transmitted pattern of data to determine whether the data was transmitted from predetermined offsets; (b) the pattern of data to determine whether the transmitted pattern of data matches a predetermined pattern of data stored on board 120; and (c) the board identification transmitted from PC 100 to determine whether the transmitted board identification matches the board identification which has been set by switch 130. At this point, whenever the predetermined locating pattern (the predetermined pattern of data followed by the board identification—with no intervening writes) has been detected, board 120 enters a LOCKED mode. Board 120 now "knows" which addresses it has been assigned in the memory space of PC 100. The assigned addresses start at the base address which was matched. In this manner then, PC 100 has assigned the addresses in memory space in PC 100 that will be utilized for communication between PC 100 and memory contained on board 120. As those of ordinary skill in the art will readily appreciate, PC 100 must repetitively write the locating pattern (i.e., the predetermined data followed by the board identification) for as long as is necessary for board 120 to cycle through all of the pre-stored base addresses.

It should be understood that the present invention is not limited to the use of base address and offset from that base address in assigning addresses in memory space to memory contained on computer interface boards. For example, the identification of the assigned addresses can be performed by matching whole addresses. Further, the predetermined base addresses utilized need not be situated at contiguous areas of memory space.

Once it is in the LOCKED mode, board 120 freezes the cycling of base addresses. Next, board 120 awaits a transmission of the board identification to a memory space address identified by a predetermined one of the predetermined offsets from a base address in the memory space. This step causes board 120 to be LOCKED and ENABLED. Once board 120 is in the ENABLED state, it will respond to accesses from PC 100. However, whenever a transmission occurs to the memory space address identified by the predetermined one of the predetermined offsets from the base address in the memory space of any data which does not match the board identification, board 120 enters a DISABLED state. When it is in the DISABLED state, board 120 will not respond to any accesses from PC 100. As one can readily appreciate, PC 100 can interact with memory on more than one board using the same addresses in memory space by assigning them to the same memory space addresses but only communicating with the one that is in the ENABLED state and placing others in the DISABLED state by generating a write to memory contained on one board using the board identification of another board. Thus, in utilizing the capability to interact with memory on more than one board using the same memory space addresses, one would reserve one address location for the purpose of enabling and disabling the boards.

Lastly, in accordance with the present invention, board 120 not only waits for enable/disable patterns but it also waits for a predetermined HUNT pattern. For example, whenever PC 100 writes a single byte hunt code, board 120 will reenter the HUNT mode and will again start searching for the board locating pattern.

It should be also understood that the present invention is not limited to embodiments wherein the computer writes the board identification exactly in accordance with the discussion above. In particular, and as illustrated in connection with the preferred embodiment below, the present invention includes embodiments wherein the computer writes data from which a board identification can be derived or extracted by the computer interface board or the computer writes data which can be translated or converted to a board identification by the computer interface board.

FIG. 2 shows a block diagram of a preferred embodiment of board locator logic 400 on board 120 for use in connection with the present invention. In particular, board 120 is comprised of power-up detection circuitry (not shown) for determining whether board 120 is being powered-up. Method and apparatus for fabricating such a power-up detection circuit are well known to those of ordinary skill in the art and the power-up detection circuit is not shown in order to enable one to more easily understand the present invention. Further, such power-up detection circuitry sets signal LOCKED to be false. LOCKED is applied as one input to address counter 200 and a 1 msec clock signal generated by a 1 msec clock generator on board 120 (not shown) is applied as a second input to address counter 200. Method and apparatus for fabricating such a 1 msec clock signal are well known to those of ordinary skill in the art and the clock generator is not shown in order to enable one to more easily understand the present invention. Address counter 200 is apparatus which is well known to those of ordinary skill in the art which, in response to the inputs, advances every 1 msec and outputs a 7-bit address which corresponds to another one of the base addresses of memory space of PC 100 utilized to communicate with memory contained on computer interface boards.

Whenever PC 100 writes to memory space which is to be assigned to memory contained on board 120, clock signal PCWR*, address signals PCADDRS(0:12) and PCADDRS (13:19), and data signal PCDATA(0:7) are applied to bus 110. PCADDRS(13:19) represents a base address in the memory space of PC 100 of the data and PCADDRS(0:12) represents an offset location of the data from the base address.

The output of address counter 200 is applied as input, along with signal PCADDRS(13:19) from PC 100, to compare 210. Compare 210 is apparatus which is well known to those of ordinary skill in the art which, in response to these inputs, asserts signal BOARD_SEL whenever signal PCADDRS(13:19) from PC 100 equals the base address of memory space output from address counter 200. As shown in FIG. 2, BOARD_SEL is applied as input to decode 220 and register 230.

Signal PCADDRS(0:12) from PC 100 (representing the offset location of data from the base address of memory space for the computer interface board) is applied as input to decode 300. Decode 300 is apparatus which is well known to those of ordinary skill in the art for generating a true whenever the address represented by PCADDRS(0:12) matches OFFSET#1 or OFFSET#2, where OFFSET#1 and OFFSET#2 are predetermined offsets used to transmit predetermined data from PC 100 to memory contained on board 120 (OFFSET#1 and OFFSET#2 are configured in decode 300 in a manner which is well known to those of ordinary skill in the art). Logic signals representing whether there is a match with OFFSET#1 or OFFSET#2 are applied as input to decode 220 and register 230, i.e., a logic signal representing whether the address represented by PCADDRS (0:12) matches OFFSET#1 is true whenever there is a match and false otherwise (similarly for PCADDRS(0:12) and OFFSET#2).

Clock signal PCWR* is applied as input to registers 230–250.

As shown in FIG. 2, the inputs to decode 220 are BOARD_SEL, logic signals representing whether there is a match with OFFSET#1 or OFFSET#2, PCDATA(0:7), and SWITCH(0:4), where SWITCH(0:4) is the board identification number which is set by switch 130 in a manner which is well known to those of ordinary skill in the art. In response, decode 220 generates signals BRD_ID, BRD_ON, BRD_OFF, and BRD_HUNT (BOARD_SEL must be true for any of these signals to be true).

Note the following with respect to the inputs to decode 220. There is a difference in the number of bits in SWITCH (0:4) and PCDATA(0:7). As a result, in order for a match to be made between board identification represented by SWITCH(0:4) and data transmitted as PCDATA(0:7), a decoding or translation is made in decode 220. Note that in the preferred embodiment, the translation entails finding five (5) predetermined bits in PCDATA(0:7). However, it should be appreciated that in general the translation may be accomplished by, for example utilizing a lookup table or by any other method of performing a translation or derivation.

Decode 220 sets BRD_ID to be true when PCDATA(0:7) has its upper three (3) bits all equal to "1" and its lower five (5) bits equal to SWITCH(0:4) (the board identification set by switch 130) and PCDATA(0:7) has been written to a predetermined one of OFFSET#1 or OFFSET#2. Decode 220 sets BRD_ON to be true when PCDATA(0:7) has its upper three (3) bits all equal to "0" and its lower five (5) bits equal to SWITCH(0:4) and PCDATA(0:7) has been written to the predetermined one of OFFSET#1 or OFFSET#2.

Decode 220 sets BRD_OFF to be true when the lower five (5) bits of PCDATA(0:7) do not equal SWITCH(0:4) and PCDATA(0:7) has been written to the predetermined one of OFFSET#1 or OFFSET#2. Finally, decode 220 sets BRD_HUNT to be true after power up and whenever PC 100 writes a predetermined hunt code at a predetermined one of OFFSET#1 or OFFSET#2. As will be described in detail below, setting PCDATA(0:7) so that its upper three (3) bits are equal to "1" and its lower five (5) bits are equal to the board identification to set BRD_ID to be true and setting PCDATA(0:7) so that its upper three (3) bits are equal to "0" and its lower five (5) bits are equal to the board identification to set BRD_ON to be true enables one to be assured that the board is disabled after it has been located. This is done in accordance with the preferred embodiment because of the following. The procedure for locating the board entails the computer repetitively transmitting the locating pattern. However, the computer does not know exactly when the board is finally "located." Thus, in general, the computer may transmit the locating pattern after the board is located. In accordance with the preferred embodiment, one has a cleaner interface if the locating pattern does not also enable the board. This is cleaner because it enables the computer to locate boards one at a time, in an orderly fashion. Thus, after all the boards have been located, the computer is assured that they are all disabled and, when a board is to be enabled, the computer sets PCDATA(0:7) so that it will cause BRD_ON to be set to true. However, it should be understood that the above-described method for ensuring that the locating pattern does not inadvertently enable a board may be accomplished by writing the board identification for the locating pattern to a first predetermined offset and writing the board identification to enable the board to another.

As shown in FIG. 2, the inputs to register 230 are PCDATA(0:7), logic signals representing whether there is a match with OFFSET#1 or OFFSET#2, and BOARD_SEL (PCWR* is applied as the clock input to register 230). In response, register 230 outputs previously stored signals which are applied as input to compare 260 and stores the inputs.

As shown in FIG. 2, the inputs to register 240 are delayed versions of PCDATA(0:7), logic signals representing whether there is a match with OFFSET#1 or OFFSET#2, and BOARD_SEL (PCWR* is applied as the clock input to register 240). In response, register 240 outputs previously stored signals which are applied as inputs to compare 270 and stores the inputs.

As shown in FIG. 2, the inputs to register 250 are delayed versions of PCDATA(0:7), logic signals representing whether there is a match with OFFSET#1 or OFFSET#2, and BOARD_SEL (PCWR* is applied as the clock input to register 250). In response, register 250 outputs previously stored signals which are applied as inputs to compare 280 and stores the inputs.

As those of ordinary skill in the art will readily appreciate, registers 230-250 contain the last write by PC 100, the next-to-last write by PC 100, and the next-to-next-to-last write by PC 100, respectively. Further, the output of the last write by PC 100, along with the logic signals representing whether there is a match with OFFSET#1 or OFFSET#2, and BOARD_SEL are output from register 230 and they are applied as input to compare 260 along with code#3. Still further, the output of the next-to-last write from PC 100, along with the logic signals representing whether there is a match with OFFSET#1 or OFFSET#2, and BOARD_SEL are output from register 240 and they are applied as input to compare 270 along with code#2. Yet still further, the output of the next-to-next-to-last write from PC 100, along with the logic signals representing whether there is a match with OFFSET#1 or OFFSET#2, and BOARD_SEL are output from register 250 and they are applied as input to compare 280 along with code#1. In the preferred embodiment, code #1 comprises eleven (11) bits which are comprised of eight (8) bits representing the first byte of the predetermined pattern of data, one bit representing an appropriate value of BOARD_SEL (true), and two bits representing the appropriate values of the logic signals representing whether there is a match with OFFSET#1 or OFFSET#2 for the first byte; code#2 comprises eleven (11) bits which are comprised of eight (8) bits representing the second byte of the predetermined pattern of data, one bit representing the appropriate value of BOARD_SEL (true), and two bits representing the appropriate values of the logic signals representing whether there is a match with OFFSET#1 or OFFSET#2 for the second byte; and code#3 comprises eleven (11) bits which are comprised of eight (8) bits representing the third byte of a predetermined pattern of data, one bit representing the appropriate value of BOARD_SEL (true), and two bits representing the appropriate values of the logic signals representing whether there is a match with OFFSET#1 or OFFSET#2 for the third byte. Values for code#1, code#2, and code#3 are provided, for example, by being hardwired into logic on board 120 in a manner which is well known to those of ordinary skill in the art.

The outputs from compares 260–280 are applied as input to AND 310 along with BRD_ID which is output from decode 220. The outputs from compares 260–280 are true if the proper pattern of data has been written from PC 100 and BRD_ID is true if PC 100 has followed writing the pattern by writing data containing the board identification (as described above) which has been set by switch 130.

As shown in FIG. 2, LOCKED is applied as input to AND 320 along with BRD_HUNT. BRD_HUNT is true after power up and whenever PC 100 writes a predetermined code to place board 120 into a HUNT mode, otherwise it is false. Since we are already in the HUNT mode, as was described above, LOCKED is false and BRD_HUNT is false (since PC 100 just wrote the board identification). Thus, the output from AND 320 is false. As further shown in FIG. 2, the output from AND 310 and from AND 320 are applied as input to OR 330. The output of AND 310 is true since BRD_ID is true and the proper pattern was written from PC 100. Since input B to OR 330 is true, the output from OR 330 is true. The output from OR 330 is applied as input to D flip-flop 340 which sets LOCKED true. Note that LOCKED is applied as input to address counter 200 and, in response, it stops cycling. Board 120 is now ready to be enabled.

Whenever PC 100 wishes to enable board 120, PCDATA (0:7) matches the board identification set by switch 130 (as described above, the lower 5 bits of PCDATA(0:7) equal SWITCH(0:4)). This data must be written to a memory space address corresponding to one of the predetermined offsets (for example, OFFSET#1). In this case, decode 220 outputs BRD_ON as true. BRD_ON and LOCKED are applied as input to AND 350. Since LOCKED is true (board 120 is ready to be enabled) and BRD_ON is true, the output from AND 350 is true. In this case, decode 220 outputs BRD_OFF as false since PCDATA(0:7) matches the board identification. BRD_OFF and SRAM_EN (a signal which is generated on board 120 as true to indicate that the board's memory is active) are applied as inputs to AND 370. Since BRD_OFF is false and SRAM_EN is false (the board's memory is not yet active), the output from AND 370 is false.

The outputs from AND 350 and 370 are applied as input to OR 360. Since the inputs to OR 370 are true and false, respectively, the output is true. The output from OR 360 is applied as input to D flip-flop 380 which sets SRAM_EN true.

Finally, SRAM_EN and BOARD_SEL are applied as inputs to AND 395. Since SRAM_EN and BOARD_SEL are now true, the output of AND 395 is true, which output is denoted as SRAM_SEL. SRAM_SEL, when true, selects the memory devices on board 120.

Whenever PC 100 wishes to disable board 120, PCDATA (0:7) is set to data which does not match the board identification. This data must be written to a memory space address corresponding to one of the predetermined offsets (for example, OFFSET#1). In this case, decode 220 outputs BRD_ON as false and BRD_OFF as true. Then, the output from AND 350 will be false, the output from AND 370 will be false, the output from OR 360 will be false, the output from D flip-flop 380 will be false, and the output of AND 395 will be false. In response, board 120 will deactivate its memory devices.

As one can readily appreciate from the above, if PC 100 writes a single byte of hunt code to one of the predetermined offsets (for example, OFFSET #1), board 120, and any other boards that are presently located at this base address, will be caused to reenter the HUNT mode and again start searching for the locating pattern. This occurs because LOCKED is true and BRD_HUNT will be true (since PC 100 just wrote the hunt code) and, in response, the output from AND 320 will be false. The output from AND 310 will be false since BRD_ID is false and the output from OR 330 will be false. Thus, Q flip-flop will set LOCKED false to restart the HUNT mode.

As has been explained above, PC 100 can locate board 120 under software control and can activate and deactivate board 120 under software control so that several boards can utilize the same board-interaction memory space in PC 100.

Although embodiments of the present invention have been discussed in terms of memory space in the computer it should be understood that present invention also includes I/O space as well. It being recognized that I/O space is referred to in the art as that portion of computer memory space, typically a segregated portion thereof, which is utilized for communication with I/O ports. Thus, when the term memory space is utilized in the claims, such a term refers to what is commonly referred to in the art as memory space as well as what is commonly referred to in the art as I/O space. Further, when the term computer interface board is utilized in the claims, such a term also includes what is commonly referred to in the art as I/O ports.

Those skilled in the art recognize that further embodiments of the present invention may be made without departing from its teachings.

What is claimed is:

1. A method for assigning memory space addresses of a computer to memory contained on a computer interface board interfaced to the computer which comprises the steps of:

setting a computer interface board identification at the computer interface board;

causing the computer to transmit to predetermined addresses of memory space in the computer, which predetermined addresses are assigned to the memory contained on the computer interface board, a predetermined pattern of data and other data from which computer interface board identification can be derived; and at the computer interface board, determining addresses assigned to the memory contained on the computer interface board from information received from the computer as a result of the step of causing the computer to transmit.

2. The method of claim 1 wherein the step of causing the computer to transmit comprises causing the computer to transmit repetitively.

3. The method of claim 2 wherein the information comprises the predetermined pattern of data, the other data from which the computer interface board identification can be derived, and the address in memory space to which the data is transmitted.

4. The method of claim 3 wherein the addresses comprise a base address in memory space and predetermined offsets from the base address.

5. The method of claim 4 wherein the step of determining at the computer interface board comprises assigning the base address.

6. The method of claim 1 wherein the step of setting a computer interface board identification at the computer interface board comprises setting a switch.

7. The method of claim 5 wherein the step of assigning the base address comprises the steps of:

generating various predetermined addresses;

comparing the base address with one or more of the generated predetermined addresses;

and, if there is a match, comparing the predetermined pattern of data with a pattern stored at the computer interface board and deriving the computer interface board identification and comparing the derived computer interface board identification with the computer interface board identification set at the computer interface board.

8. The method of claim 1 further comprising the step of enabling the computer interface board by causing the computer to transmit the other data or still other data from which the computer interface board identification can be derived to a predetermined enable address of memory space.

9. The method of claim 8 further comprising the step of disabling the computer interface board by causing the computer to transmit data from which the computer interface board identification cannot be derived to a predetermined disable address of memory space.

10. The method of claim 7 further comprising the step of causing the computer interface board to search for the base address, which step comprises causing the computer to transmit a hunt predetermined code to a predetermined hunt address of memory space.

11. The method of claim 1 wherein the predetermined pattern of data comprises three bytes of data and the other data from which the computer interface board identification data can be derived comprises a byte of data.

12. A computer interface board which contains memory which is assigned memory space addresses in a computer, which computer interface board comprises:

means for setting a computer interface board identification at the computer interface board;

means for receiving information transmitted to the computer interface board as a result of the computer transmitting to predetermined addresses of memory space in the computer, which predetermined addresses are assigned to the memory contained on the computer interface board, a predetermined pattern of data and other data from which the computer interface board identification can be derived; and

11 means for determining addresses assigned to the memory contained on the computer interface board from the information.

13. The computer interface board of claim 12 wherein the means for receiving comprises means for repetitively receiving.

14. The computer interface board of claim 13 wherein the information comprises the predetermined pattern of data, the other data from which the computer interface board identification can be derived, and the address in memory space to which the data is transmitted.

15. The computer interface board of claim 14 wherein the addresses comprise a base address in memory space and predetermined offsets from the base address.

16. The computer interface board of claim 15 wherein the means for determining comprises means for assigning the base address.

17. The computer interface board of claim 12 wherein the means for setting a computer interface board identification comprises a switch.

18. The computer interface board of claim 17 wherein the switch comprises a rotary switch.

19. The computer interface board of claim 16 wherein the means for assigning the base address comprises:

means for generating various predetermined addresses;

means for comparing the base address with one or more of the generated predetermined addresses;

means for comparing the predetermined pattern of data with a pattern stored at the computer interface board; and means for deriving the computer interface board identification and means for comparing the derived computer interface board identification data with the computer interface board identification set at the computer interface board.

20. The computer board of claim 12 which further comprises:

means for enabling the computer interface board in response to further information being received by the means for receiving as a result of the computer transmitting the other data or still other data from which the computer interface identification can be derived to a predetermined enable address of memory space.

21. The computer board of claim 20 which further comprises:

means for disabling the computer interface board in response to still further information being received by the means for receiving as a result of the computer transmitting data from which the computer interface board cannot be derived to a predetermined disable address of memory space.

22. The computer board of claim 19 which further comprises:

means for causing the computer interface board to search for the base address in response to yet still further information being received by the means for receiving as a result of the computer transmitting a hunt predetermined code to a predetermined hunt address of memory space.

23. A computer and a computer interface board which is interfaced to the computer, which computer assigns addresses in its memory space to memory contained on the computer interface board, which computer and computer interface board comprise:

means for setting a computer interface board identification at the computer interface board;

12 means, disposed in the computer, for transmitting to predetermined addresses of memory space in the computer, which predetermined addresses are assigned to the memory contained on the computer interface board, a predetermined pattern of data and other data from which the computer interface board identification can be derived;

means, disposed on the computer interface board, for receiving information transmitted to the computer interface board as a result of the computer transmitting the predetermined pattern of data and the other data from which computer interface board identification can be derived; and means, disposed on the computer interface board, for determining addressees assigned to the memory contained on the computer interface board from the information.

24. A computer interface board which contains memory which is assigned memory space addresses in a computer, which computer interface board comprises:

an identification-setter which sets a computer interface board identification at the computer interface board;

an information-receiver which receives information transmitted to the computer interface board as a result of the computer transmitting to predetermined addresses of memory space in the computer, which predetermined addresses are assigned to the memory contained on the computer interface board, a predetermined pattern of data and other data from which the computer interface board identification can be derived; and an address-assignor which determines addresses assigned to the memory contained on the computer interface board from the information.

25. The computer interface board of claim 24 wherein the information-receiver is adapted to repetitively receive information.

26. The computer interface board of claim 25 wherein the information comprises the predetermined pattern of data, the other data from which the computer interface board identification can be derived, and the address in memory space to which the data is transmitted.

27. The computer interface board of claim 26 wherein the addresses comprise a base address in memory space and predetermined offsets from the base address.

28. The computer interface board of claim 27 wherein the address-assignor comprises a base-address-assignor which assigns the base address.

29. The computer interface board of claim 24 wherein the identification-setter comprises a switch.

30. The computer interface board of claim 29 wherein the switch comprises a rotary switch.

31. The computer interface board of claim 28 wherein the base-address-assignor comprises:

an address-generator which generates various predetermined addresses;

an address-comparer which compares the base address with one or more of the generated predetermined addresses;

a pattern-comparer which compares the predetermined pattern of data with a pattern stored at the computer interface board;

a deriver which derives the computer interface board identification; and an id-comparer which compares the derived computer interface board identification data with the computer interface board identification set at the computer interface board.

32. The computer board of claim 24 which further comprises:

an enabler which enables the computer interface board in response to further information being received by the information-receiver as a result of the computer transmitting the other data or still other data from which the computer interface identification can be derived to a predetermined enable address of memory space.

33. The computer board of claim 32 which further comprises:

a disabler which disables the computer interface board in response to still further information being received by the information-receiver as a result of the computer transmitting data from which the computer interface board cannot be derived to a predetermined disable address of memory space.

34. The computer board of claim 31 which further comprises:

a hunter which causes the computer interface board to search for the base address in response to yet still further information being received by the information-receiver as a result of the computer transmitting a hunt predetermined code to a predetermined hunt address of memory space.

35. A computer and a computer interface board which is interfaced to the computer, which computer assigns addresses in its memory space to memory contained on the computer interface board, which computer and computer interface board comprise:

an identification-setter which sets a computer interface board identification at the computer interface board;

a transmitter, disposed in the computer, which transmits to predetermined addresses of memory space in the computer, which predetermined addresses are assigned to the memory contained on the computer interface board, a predetermined pattern of data and other data from which the computer interface board identification can be derived;

an information-receiver, disposed on the computer interface board, which receives information transmitted to the computer interface board as a result of the computer transmitting the predetermined pattern of data and the other data from which computer interface board identification can be derived; and an address-assignor, disposed on the computer interface board, which determines addressees assigned to the memory contained on the computer interface board from the information.

* * * * *